United States Patent
Su et al.

(10) Patent No.: US 10,770,964 B1
(45) Date of Patent: Sep. 8, 2020

(54) OVERSHOOT REDUCTION CIRCUIT FOR BUCK CONVERTER

(71) Applicant: ANPEC ELECTRONICS CORPORATION, Hsinchu (TW)

(72) Inventors: Chih-Heng Su, Hsinchu (TW); Sheng-Wen Pan, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/517,832

(22) Filed: Jul. 22, 2019

(30) Foreign Application Priority Data

May 3, 2019 (TW) .............................. 108115439 A

(51) Int. Cl.
| H02M 1/32 | (2007.01) |
| H02M 1/08 | (2006.01) |
| H02M 3/158 | (2006.01) |

(52) U.S. Cl.
CPC ............... *H02M 1/32* (2013.01); *H02M 1/08* (2013.01); *H02M 3/158* (2013.01)

(58) Field of Classification Search
CPC ........... H02M 1/32; H02M 1/08; H02M 3/158
USPC ....................................................... 323/271
See application file for complete search history.

(56) References Cited

U.S. PATENT DOCUMENTS

| 8,253,400 | B2* | 8/2012 | Irissou | H02M 3/156 323/282 |
| 9,608,527 | B1* | 3/2017 | Choi | H02M 3/33507 |
| 9,806,617 | B1* | 10/2017 | Ozawa | H02M 3/158 |
| 9,997,992 | B1* | 6/2018 | Wu | H02M 3/1588 |
| 10,180,695 | B1* | 1/2019 | Bikulcius | G05F 1/575 |
| 2007/0013434 | A1* | 1/2007 | Peschke | H02M 1/32 327/536 |
| 2008/0252264 | A1* | 10/2008 | Chen | H02J 7/0072 320/161 |
| 2013/0077354 | A1* | 3/2013 | Behagel | H02M 3/33523 363/21.01 |
| 2014/0184180 | A1* | 7/2014 | Kronmueller | H02M 3/156 323/271 |

(Continued)

OTHER PUBLICATIONS

Received STIC search report from EIC 2800 searcher Samir Patel on Dec. 20, 2019. (Year: 2019).*

*Primary Examiner* — Shawki S Ismail
*Assistant Examiner* — Htet Z Kyaw
(74) *Attorney, Agent, or Firm* — Li & Cai Intellectual Property (USA) Office

(57) ABSTRACT

An overshoot reduction circuit for a buck converter includes an operational amplifier, a first sampler circuit, a pulse generator circuit, a pulse calculator circuit, a second sampler circuit and a comparator. The operational amplifier outputs an operation amplified signal according to a buck converted signal of the buck converter and a voltage feedback signal of the operational amplifier. The first sampler circuit samples a first capacitor voltage signal according to a lower bridge conducted signal of the buck converter. The pulse generator circuit outputs a pulse signal. The pulse calculator circuit outputs a first sample compared signal according to the first capacitor voltage signal and the pulse signal. The second sampler circuit samples a second capacitor voltage signal according to the lower bridge conducted signal. The comparator compares the second capacitor voltage signal with the first sample compared signal to output a comparing signal to the buck converter.

8 Claims, 7 Drawing Sheets

(56) References Cited

U.S. PATENT DOCUMENTS

| | | | | |
|---|---|---|---|---|
| 2014/0225584 A1* | 8/2014 | Dong | ............... | H02M 3/156 |
| | | | | 323/284 |
| 2015/0008895 A1* | 1/2015 | Weng | ............... | H02M 3/156 |
| | | | | 323/285 |
| 2015/0028830 A1* | 1/2015 | Chen | ............... | H02M 3/156 |
| | | | | 323/271 |
| 2015/0162829 A1* | 6/2015 | Chiu | ............... | H02M 3/156 |
| | | | | 323/271 |
| 2015/0200592 A1* | 7/2015 | Chang | ............... | H02M 3/156 |
| | | | | 323/271 |
| 2015/0378386 A1* | 12/2015 | Li | ............... | G05F 3/267 |
| | | | | 323/315 |
| 2016/0359410 A1* | 12/2016 | Kumasaka | ............ | H02M 3/157 |
| 2017/0199537 A1* | 7/2017 | Duong | ............... | G05F 1/575 |
| 2018/0321702 A1* | 11/2018 | Chen | ............... | H02M 1/36 |

* cited by examiner

OVERSHOOT REDUCTION CIRCUIT FOR BUCK CONVERTER

CROSS-REFERENCE TO RELATED PATENT APPLICATION

This application claims the benefit of priority to Taiwan Patent Application No. 108115439, filed on May 3, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a buck converter, and more particularly to an overshoot reduction circuit for the buck converter.

BACKGROUND OF THE DISCLOSURE

An electronic device generally includes various components requiring different operating voltages. Therefore, a DC-DC voltage converter is essential for voltage adjustment and stabilization of the electronic device. Based upon different power requirements, various types of DC-DC voltage converters such as a buck converter and a boost converter have been developed. The buck converter can decrease an input DC voltage to a default voltage, and the boost converter can increase an input DC voltage. With advances in circuit technologies, both the buck and boost converters have been adjusted for different system architectures and requirements.

SUMMARY OF THE DISCLOSURE

In response to the above-referenced technical inadequacies, the present disclosure provides an overshoot reduction circuit for a buck converter. The buck converter includes an upper bridge switch, a lower bridge switch and an operational transconductance amplifier. A first terminal of the upper bridge switch is connected to an input voltage source. A second terminal of the upper bridge switch is connected to a first terminal of the lower bridge switch. A second terminal of the lower bridge switch is grounded. A first input terminal of the operational transconductance amplifier is connected to a first reference voltage source. A second input terminal of the operational transconductance amplifier is connected to a node between the second terminal of the upper bridge switch and the first terminal of the lower bridge switch. The overshoot reduction circuit includes an operational amplifier, a first sampler circuit, a pulse generator circuit, a pulse calculator circuit, a second sampler circuit, a first comparator, a second comparator and a switch driver circuit. The operational amplifier has a first amplification input terminal and a second amplification input terminal. The first amplification input terminal of the operational amplifier is connected to a node between the first terminal of the upper bridge switch and the second terminal of the lower bridge switch to obtain a buck converted signal. An output terminal of the operational amplifier is grounded through a voltage divider circuit. The voltage divider circuit includes a first resistor and a second resistor. The second amplification input terminal of the operational amplifier is connected to a node between the first resistor and the second resistor to obtain a voltage feedback signal. The operational amplifier is configured to output an operation amplified signal according to the buck converted signal and the voltage feedback signal. The first sampler circuit is grounded through a first capacitor and configured to sample a first capacitor voltage signal of the first capacitor according to a lower bridge conducted signal of the lower bridge switch from the buck converter. The pulse generator circuit is configured to output a pulse signal according to the lower bridge conducted signal from the buck converter. The pulse calculator circuit is connected to the first sampler circuit and the pulse generator circuit. The pulse calculator circuit is configured to store and output a first sample compared signal according to the first capacitor voltage signal and the pulse signal. The second sampler circuit is grounded through a second capacitor. The second sampler circuit is configured to sample a second capacitor voltage signal of the second capacitor according to the lower bridge conducted signal of the lower bridge switch from the buck converter. The first comparator has a first comparison input terminal connected to the second sampler circuit and a second comparison input terminal connected to the pulse generator circuit. The first comparator is configured to compare the second capacitor voltage signal received through the first comparison input terminal with the first sample compared signal received through the second comparison input terminal to output a first comparing signal. The second comparator has a third comparison input terminal connected to a second reference voltage source and a fourth comparison input terminal connected to an output terminal of the operational transconductance amplifier. The second comparator receives a reference voltage from the second reference voltage source through the third comparison input terminal and receives an error amplified signal from the operational transconductance amplifier through the fourth comparison input terminal. The second comparator is configured to compare the error amplified signal with the reference voltage to output a second comparing signal. The switch driver circuit is connected to the first comparator, the second comparator, and a control terminal of the lower bridge switch. The switch driver circuit is configured to output a lower bridge switching signal to the lower bridge to control the lower bridge according to the first comparing signal and the second comparing signal.

In one aspect, the pulse generator circuit is configured to calculate an average voltage of a voltage of the first capacitor voltage signal and a voltage of the pulse signal, and accordingly output the first sample compared signal to the first comparator.

In one aspect, the first comparison input terminal of the first comparator is a non-inverting input terminal, the second comparison input terminal is an inverting input terminal, the third comparison input terminal of the third comparator is a non-inverting input terminal, and the fourth comparison input terminal is an inverting input terminal. When a voltage of the first sample compared signal is higher than a voltage of the second capacitor voltage signal, the first comparator outputs the first comparing signal at a high level to the switch driver circuit. When a voltage of the error amplified signal is higher than a voltage of the second reference voltage source, the second comparator outputs the second comparing signal at a high level to the switch driver circuit.

The switch driver circuit turns off the lower bridge according to the first comparing signal at the high level and the second comparing signal at the high level.

In one aspect, the overshoot reduction circuit further includes a first switch. The first switch has a control terminal connected to the output terminal of the operational amplifier, a first terminal connected to a common voltage source, and a second terminal connected to the first resistor.

In one aspect, the overshoot reduction circuit further includes a second switch. The second switch has a control terminal connected to the output terminal of the operational amplifier, a first terminal connected to a common voltage source, and a second terminal connected to the first capacitor through the first sampler circuit.

In one aspect, the overshoot reduction circuit further includes a third switch. The third switch has a control terminal connected to an output terminal of the pulse generator circuit, a first terminal connected to a node between the first sampler circuit and the first capacitor, and a second terminal grounded.

In one aspect, the overshoot reduction circuit further includes a fourth switch. The fourth switch has a control terminal connected to the output terminal of the operational amplifier, a first terminal connected to a common voltage source, and a second terminal connected to the second capacitor through the second sampler circuit.

In one aspect, the overshoot reduction circuit further includes a fifth switch. The fifth switch has a control terminal connected to an output terminal of the pulse generator circuit, a first terminal connected to a node between the second sampler circuit and the second capacitor, and a second terminal grounded.

It should be understood that, when a heavy load unloads to a light load, the common buck converter outputs an overshoot voltage. Under this condition, a conduction time of the lower bridge switch is longer than a time that operates in a normal mode. Therefore, the present disclosure provides the overshoot reduction circuit for the buck converter, which can turn on or off the lower bridge switch of the buck converter, according to a conduction state of the lower bridge switch. It is worth noting that the lower bridge switch of the buck converter is turned off before the output voltage of the buck converter reaches a voltage threshold and the output current reaches a current threshold. As a result, the current flows from the source terminal of the lower bridge switch through the internal diode of the lower bridge switch to the inductor and the capacitor at the output terminal of the buck converter. Therefore, it can effectively prevent the overshoot voltage and the overshoot current from being generated by the buck converter.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
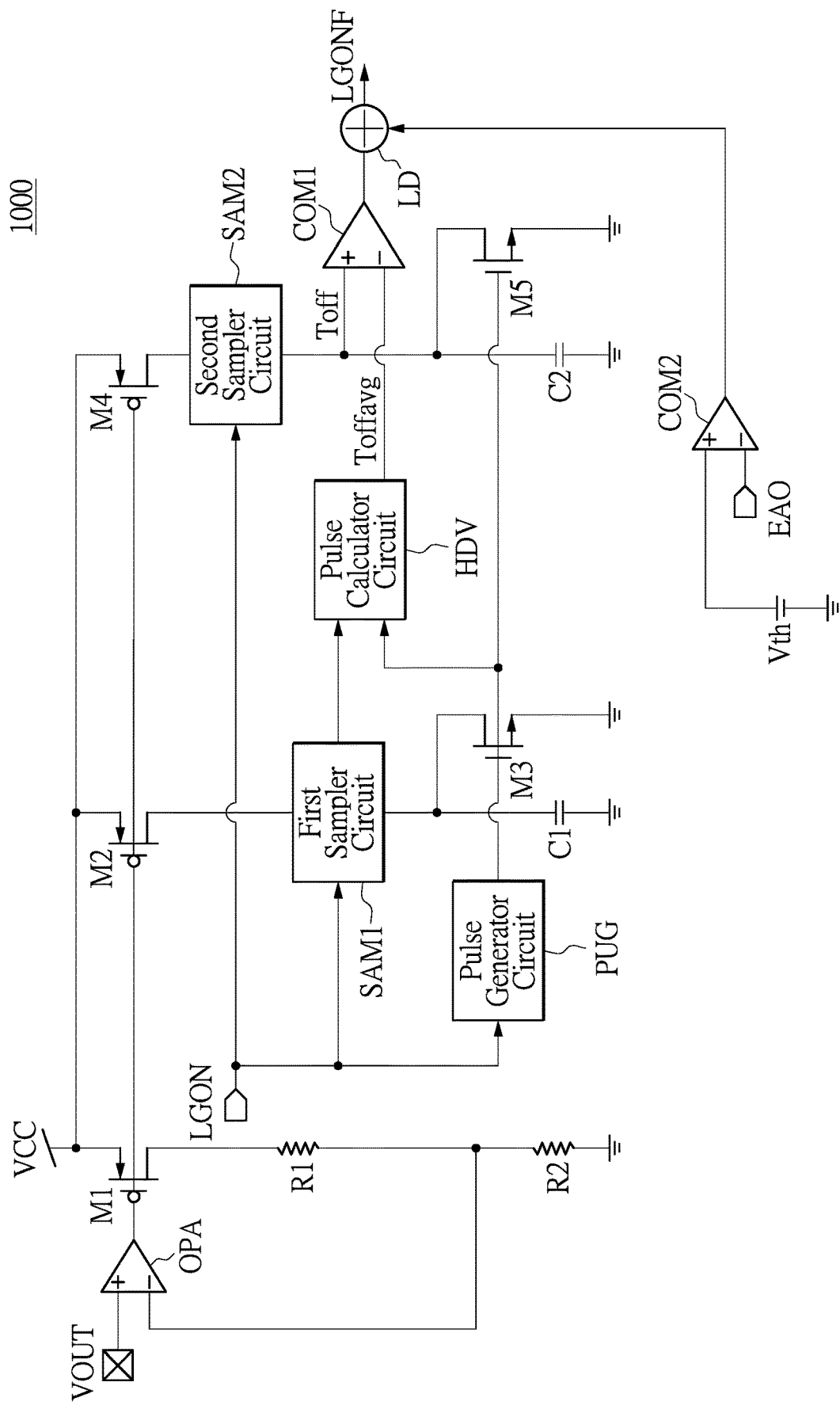
FIG. 1 is a circuit layout diagram of an overshoot reduction circuit for a buck converter according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2A:
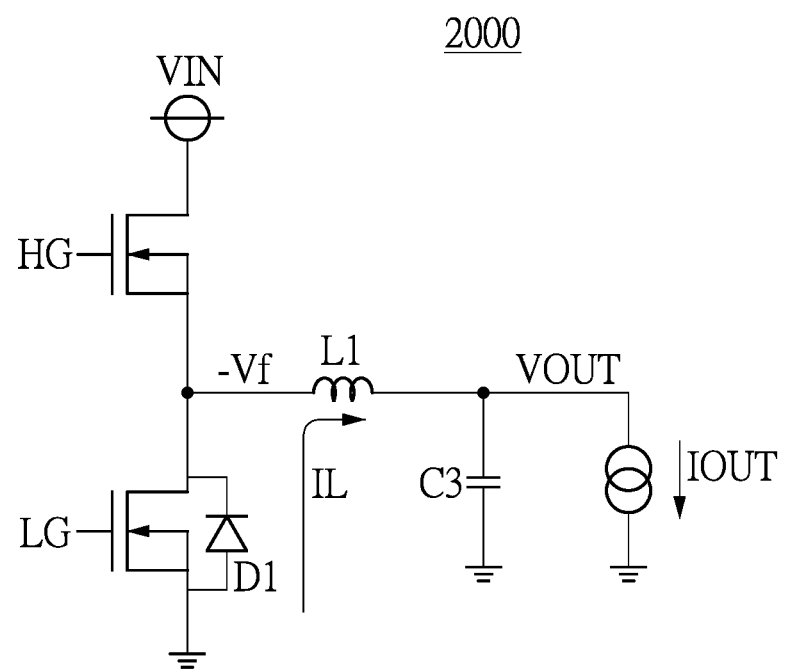
FIG. 2A is a circuit layout diagram of a buck converter according to an embodiment of the present disclosure.

Reference is made to FIGS. 1 and 2A, wherein FIG. 1 is a circuit layout diagram of an overshoot reduction circuit for a buck converter according to an embodiment of the present disclosure, and FIG. 2A is a circuit layout diagram of a buck converter according to an embodiment of the present disclosure.

As shown in FIG. 1, an overshoot reduction circuit 1000 for the buck converter includes an operational amplifier OPA, a first sampler circuit SAM1, a pulse generator circuit PUG, a pulse calculator circuit HDV, a second sampler circuit SAM2, a first comparator COM1, a first switch M1, a second switch M2, a third switch M3, a fourth switch M4, a fifth switch M5, a second comparator COM2, and a switch driver circuit LD. The overshoot reduction circuit 1000 shown in FIG. 1 is configured to turn on or off a lower bridge switch LG of a buck converter 2000 shown in FIG. 2A.

The operational amplifier OPA has a first amplification input terminal and a second amplification input terminal. The first amplification input terminal such as a non-inverting input terminal of the operational amplifier OPA shown in FIG. 1 is connected to the buck converter 2000 shown in FIG. 2A.

As shown in FIG. 2A, the buck converter 2000 includes an upper bridge switch HG and the lower bridge switch LG The upper bridge switch HG and the lower bridge switch LG are n-channel depletion mode MOSFETs, but the present disclosure is not limited thereto. The upper bridge switch HG is connected to the lower bridge switch LG The second amplification input terminal of the operational amplifier OPA of the overshoot reduction circuit 1000 is connected to a node between the upper bridge switch HG and the lower bridge switch LG of the buck converter 2000. That is, the second amplification input terminal of the operational amplifier OPA is connected to an output terminal of the buck converter 2000.

More specifically, the buck converter 2000 further includes an inductor L1 and a third capacitor C3. A first terminal such as a drain terminal of the upper bridge switch HG of the buck converter 2000 is connected to an input voltage source VIN. A second terminal such as a source terminal of the upper bridge switch HG is connected to a first terminal such as a drain terminal of the lower bridge switch LG A second terminal of the lower bridge switch LG is grounded. One terminal of the inductor L1 is connected to the node between the upper bridge switch HG and the lower bridge switch LG The other terminal of the inductor L1 is grounded through the third capacitor C3. The second amplification input terminal of the operational amplifier OPA is connected to a node between the inductor L1 and the third capacitor C3 of the buck converter 2000.

As shown in FIG. 1, the second amplification input terminal such as an inverting input terminal of the operational amplifier OPA of the overshoot reduction circuit 1000 is connected to an output terminal of the operational amplifier OPA through a voltage divider circuit. The voltage divider circuit includes a first resistor R1 and a second resistor R2. One terminal of the first resistor R1 is connected to the output terminal of the operational amplifier OPA. The other terminal of the first resistor R1 is connected to one terminal of the second resistor R2. The other terminal of the second resistor R2 is grounded. The second amplification input terminal of the operational amplifier OPA is connected to a node between the first resistor R1 and the second resistor R2.

A first switch M1 may be disposed between the output terminal of the operational amplifier OPA and the voltage divider circuit. The first switch M1 may be a P-channel enhancement mode MOSFET or any other type of transistors, but the present disclosure is not limited thereto. A control terminal such as a gate terminal of the first switch M1 is connected to the output terminal of the operational amplifier OPA. A first terminal such as a source terminal of the first switch M1 is connected to a common voltage source VCC. A second terminal such as a drain terminal of the first switch M1 is connected to the one terminal of the first resistor R1 of the voltage divider circuit.

The first amplification input terminal of the operational amplifier OPA receives a buck converted signal from the node between the upper bridge switch HG and the lower bridge switch LG of the buck converter 2000. More precisely, the first amplification input terminal of the operational amplifier OPA obtains the buck converted signal from the node between the inductor L1 and the third capacitor C3 of the buck converter 2000. The second amplification input terminal of the operational amplifier OPA obtains a voltage feedback signal from the node between the first resistor R1 and the second resistor R2. The operational amplifier OPA is configured to output an operation amplified signal to the control terminal of the first switch M1 to control the first switch M1 according to the buck converted signal and the voltage feedback signal.

The operational amplifier OPA generates the operation amplified signal for controlling the first switch M1 to generate a current, which is calculated by the following equation: $I1 = Vout/R2$, wherein $I1$ represents the current of the first switch M1, Vout represents an output voltage VOUT of the buck converter 2000, and R2 represents the second resistor R2 shown in FIG. 1. As shown in FIG. 1, a current mirror circuit includes the first switch M1, the second switch M2 and the fourth switch M4. A current of the second switch M2 is equal to a current of the first switch M1, and a current of the fourth switch M4 is equal to the current of the first switch M1. A first capacitor C1 is charged by the current of the second switch M2 within a constant time to obtain a voltage, which is calculated by the following equation:

I2*T=C1V, wherein I1 represents the current of the first switch M1, Vout represents an output voltage of the buck converter 2000, I2 represents the current flowing from the second switch M2 to the first capacitor C1, T represents a time within which the first capacitor C1 is charged by the current of the second switch M2, C1 represents a capacitance of the first capacitor C1, and V represents the voltage of the first capacitor C1. In addition, a second capacitor C2 is charged by the current of the fourth switch M4 within a constant time to obtain a voltage, which is calculated by the following equation: I4*T=C2V, wherein I4 represents a current flowing from the fourth switch M4 to the second capacitor C2, T represents a time within which the second capacitor C2 is charged by the current of the fourth switch M4, C2 represents a capacitance of the second capacitor C2, and V represents the voltage of the second capacitor C2.

The second switch M2 and the fourth switch M4 may be P-channel enhancement mode MOSFETs or other types of transistors, but the present disclosure is not limited thereto. A first terminal such as a source terminal of the second switch M2 and a first terminal such as a source terminal of the fourth switch M4 are connected to the common voltage source VCC. A control terminal such as a gate terminal of the second switch M2 and a control terminal such as a gate terminal of the fourth switch M4 are connected to the output terminal of the operational amplifier OPA. A second terminal such as a drain terminal of the second switch M2 is connected to an input terminal of the first sampler circuit SAM1. A second terminal such as a drain terminal of the fourth switch M4 is connected to an input terminal of the second sampler circuit SAM2.

The third switch M3 may be an N-channel enhancement mode MOSFET or any other type of transistors, but the present disclosure is not limited thereto. A first terminal of the third switch M3 is connected to a non-ground terminal of the first capacitor C1. A control terminal such as a gate terminal of the third switch M3 may be connected to an output terminal of the pulse generator circuit PUG The pulse generator circuit PUG may control the third switch M3. The first terminal such as a drain terminal of the third switch M3 is connected to a node between the first sampler circuit SAM1 and the first capacitor C1. A second terminal such as a source terminal of the third switch M3 is grounded.

The first capacitor C1 is charged by the current flowing through the second switch M2 to the first capacitor C1. The first sampler circuit SAM1 is grounded through the first capacitor C1. The first sampler circuit SAM1 may be connected to the lower bridge switch LG of the buck converter 2000. For example, when the lower bridge switch LG is turned on, the first sampler circuit SAM1 is configured to sample the voltage of the first capacitor C1 to output a first capacitor voltage signal, according to a lower bridge conducted signal LGON of the lower bridge switch LG from the buck converter 2000.

The pulse generator circuit PUG may be connected to the lower bridge switch LG of the buck converter 2000. For example, when the lower bridge switch LG is turned off, the pulse generator circuit PUG is configured to output a pulse signal, according to the lower bridge conducted signal LGON from the buck converter 2000.

The pulse calculator circuit HDV is connected to the first sampler circuit SAM1 and the pulse generator circuit PUG The pulse calculator circuit HDV is configured to store the first capacitor voltage signal from the first sampler circuit SAM1 and the pulse signal from the pulse generator circuit PUG When the pulse calculator circuit HDV receives the first capacitor voltage signal, the lower bridge switch LG is turned off. Under this condition, the pulse calculator circuit HDV outputs and stores a first sample compared signal Toffavg, according to the first capacitor voltage signal of the first sampler circuit SAM1 and the pulse signal of the pulse generator circuit PUG For example, the pulse calculator circuit HDV calculates an average voltage of a voltage of the first capacitor voltage signal and a voltage of the pulse signal to output the first sample compared signal Toffavg. After the pulse calculator circuit HDV stores the first sample compared signal Toffavg, the third switch SW3 is turned on and the first capacitor C1 discharges.

The second sampler circuit SAM2 is grounded through the second capacitor C2. A capacitance of the second capacitor C2 is N times a capacitance of the first capacitor C1, wherein N may be a positive value larger than 1, but the present disclosure is not limited thereto. A first terminal of the fifth switch M5 is connected to a non-ground terminal of the second capacitor C2.

The fifth switch M5 may be an N-channel enhancement mode MOSFET or any other type of transistors, but the present disclosure is not limited thereto. A control terminal such as a gate terminal of the fifth switch M5 is connected to the output terminal of the pulse generator circuit PUG The pulse generator circuit PUG controls the fifth switch M5. A first terminal such as a drain terminal of the fifth switch M5 is connected to a node between the second sampler circuit SAM2 and the second capacitor C2. A second terminal such as a source terminal of the fifth switch M5 is grounded.

The second sampler circuit SAM2 is connected to the lower bridge switch LG of the buck converter 2000. For example, after the first capacitor C1 discharges, the lower bridge switch LG is turned on again to allow the current of the fourth switch M4 to flow through the second sampler circuit SAM2 to charge the second capacitor C2. Then, the second sampler circuit SAM2 is configured to sample a voltage of the charged second capacitor C2 to output a second capacitor voltage signal Toff, according to the lower bridge conducted signal LGON of the lower bridge switch LG from the buck converter 2000.

The first comparator COM1 has a first comparison input terminal and a second comparison input terminal. The first comparison input terminal such as a non-inverting terminal of the first comparator COM1 is connected to the second sampler circuit SAM2. The second comparison input terminal such as an inverting terminal of the first comparator COM1 is connected to the pulse calculator circuit HDV.

The first comparator COM1 is configured to compare the second capacitor voltage signal Toff received through the first comparison input terminal with the first sample compared signal Toffavg received through the second comparison input terminal to output a first comparing signal to the lower bridge switch LG from the buck converter 2000 to control the lower bridge switch LG On the other hand, the second comparator COM2 has a third comparison input terminal and a fourth comparison input terminal. The third comparison input terminal such as a non-inverting terminal of the second comparator COM2 is connected to a reference voltage source Vth. The fourth comparison input terminal such as an inverting terminal of the second comparator COM2 is connected to an output terminal of the operational transconductance amplifier of the buck converter 2000. For example, one input terminal of the operational transconductance amplifier may be connected to the output terminal of the buck converter 2000 and a non-ground terminal of the third capacitor C3 through a voltage divider circuit. Another input terminal of the operational transconductance amplifier may be connected to the reference voltage source Vth. The operational transconductance amplifier is configured to output an error amplified signal EAO, according to a voltage difference between a divided output voltage of the buck converter 2000 from the voltage divider circuit and a reference voltage of the reference voltage source Vth.

The second comparator COM2 is configured to compare the reference voltage of the reference voltage source Vth received through the third comparison input terminal with the error amplified signal EAO received through the fourth comparison input terminal to output a second comparing signal to the switch driver circuit LD.

The switch driver circuit LD may be disposed between the first comparator COM1 and the buck converter 2000, and between the second comparator COM2 and the buck converter 2000. An input terminal of the switch driver circuit LD is connected to output terminals of the first comparator COM1 and the second comparator COM2. An output terminal of the switch driver circuit LD is connected to a control terminal such as a gate terminal of the lower bridge switch LG of the buck converter 2000.

The switch driver circuit LD may output a lower bridge switching signal LGONF to the control terminal of the lower bridge switch LG to control the lower bridge switch LG, according to the first comparing signal from the first comparator COM1 and the second comparing signal from the second comparator COM2.

Figure 2B:
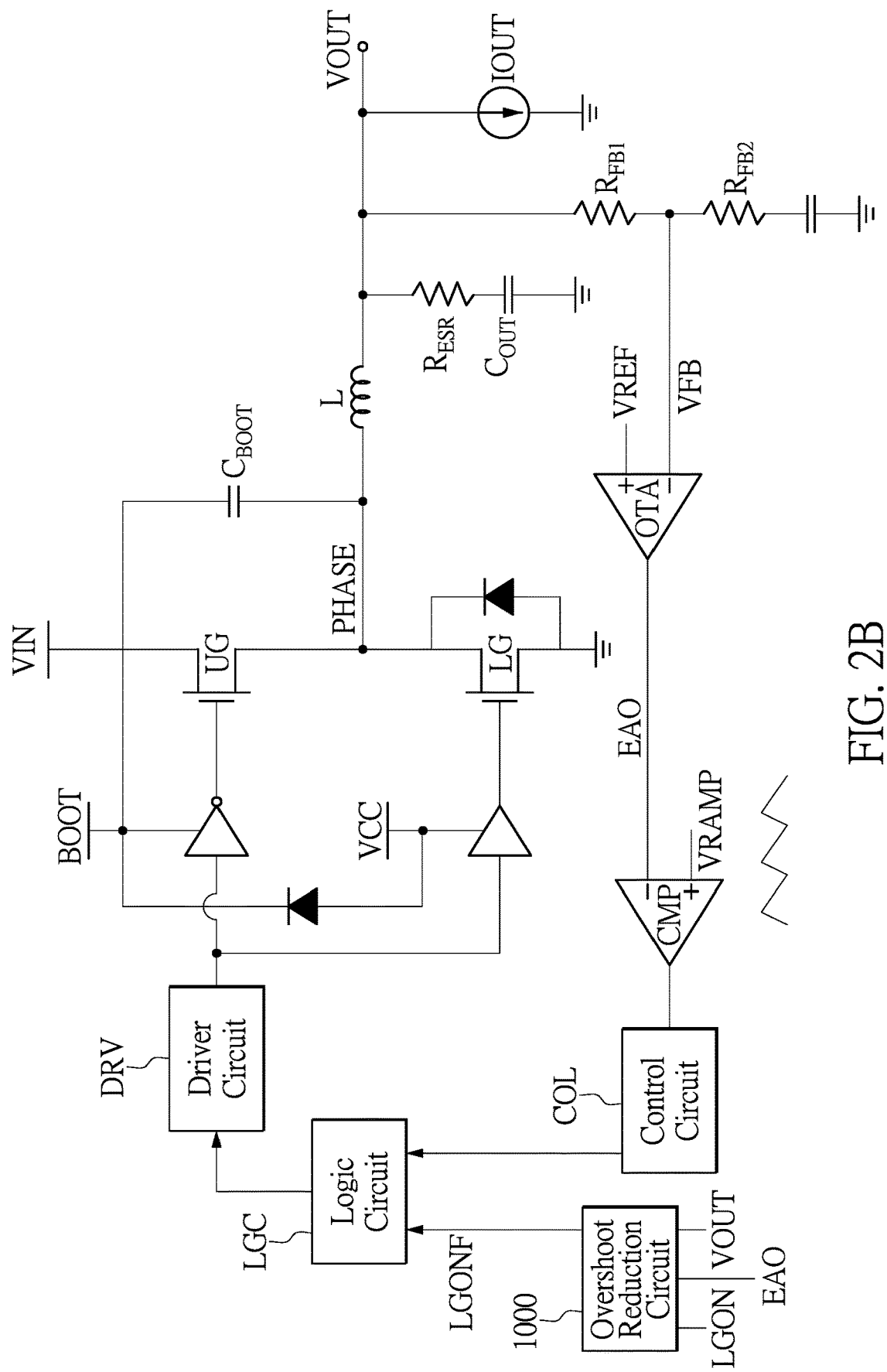
FIG. 2B is a circuit layout diagram of an overshoot reduction circuit for a buck converter according to an embodiment of the present disclosure.

Reference is made to FIGS. 1 and 2B, wherein FIG. 1 is the circuit layout diagram of an overshoot reduction circuit for the buck converter according to the embodiment of the present disclosure, and FIG. 2B is a circuit layout diagram of an overshoot reduction circuit for a buck converter according to an embodiment of the present disclosure.

As shown in FIG. 2B, the buck converter includes a control circuit COL, a logic circuit LGC, a driver circuit DRV, a switch circuit including an upper bridge switch UG and the lower bridge switch LG, a capacitor CBOOT, an inductor L, a resistor RESR, a capacitor COUT, the voltage driver circuit including a resistor RFB1 and a resistor RFB2, a current source for providing an output current IOUT, an operational transconductance amplifier OTA and a comparator CMP.

As shown in FIGS. 1 and 2B, the overshoot reduction circuit 1000 is connected to the logic circuit LGC of the buck converter through the switch driver circuit LD. The logic circuit LGC is connected to the driver circuit DRV and the control circuit COL. The driver circuit DRV is connected to control terminals of the upper bridge switch UG and the lower bridge switch LG of the switch circuit. For example, the upper bridge switch UG of the buck converter is a P-channel enhancement mode MOSFET and the lower bridge switch LG is an N-channel enhancement mode MOSFET. The driver circuit DRV of the buck converter is connected to gate terminals of the upper bridge switch UG and the lower bridge switch LG A first terminal such as a drain terminal of the upper bridge switch UG is connected to the input voltage source VIN. A second terminal such as a source terminal of the upper bridge switch UG is connected to the first terminal of such as the drain terminal of the lower bridge switch LG The second terminal such as a source terminal of the lower bridge switch LG is grounded.

One terminal of the inductor L is connected to a node between the second terminal of the upper bridge switch UG and the first terminal of the lower bridge switch LG The other terminal of the inductor L is connected to a series circuit of the resistor RESR and the capacitor COUT. One terminal of the resistor RFB1 of the voltage driver circuit is connected to a node between the inductor L and the series circuit of the resistor RESR and the capacitor COUT. The other terminal of the resistor RFB1 is connected to one terminal of the resistor RFB2 of the voltage driver circuit. The other terminal of the resistor RFB2 is grounded. In addition, the current source for providing the output current IOUT is connected to a node between the other terminal of the inductor L and the one terminal of the resistor RFB1 of the voltage driver circuit.

A first terminal such as a non-inverting terminal of the operational transconductance amplifier OTA of the buck converter is connected to a reference voltage source VREF and receives a reference voltage from the reference voltage source VREF. A second input terminal such as an inverting terminal of the operational transconductance amplifier OTA is connected to a node between the resistor RFB1 and the resistor RFB2 of the voltage driver circuit. The output voltage VOUT of the buck converter 2000 at the node between the inductor L and the series circuit of the resistor RESR and the capacitor COUT is divided by the voltage driver circuit to output a feedback voltage VFB to the second terminal of the operational transconductance amplifier OTA. The operational transconductance amplifier OTA is configured to output the error amplified signal EAO according to the reference voltage of the reference voltage source VREF and the feedback voltage VFB.

A first comparison input terminal such as an inverting terminal of the comparator CMP of the buck converter is connected to an output terminal of the operational transconductance amplifier OTA, and receives the error amplified signal EAO from the operational transconductance amplifier OTA. A second comparison input terminal such as a non-inverting terminal of the comparator CMP is connected to a ramp circuit and receives a ramp signal VRAMP from the ramp circuit. The comparator CMP is configured to compare the error amplified signal EAO and the ramp signal VRAMP to output a comparing signal to the control circuit COL. The control circuit COL of the voltage converter is connected to an output terminal of the comparator CMP and an input terminal of the logic circuit LGC. The control circuit COL is configured to output a control signal to the logic circuit LGC according to the comparing signal of the comparator CMP.

The overshoot reduction circuit 1000 may be connected to the output terminal of the buck converter through the switch driver circuit LD. That is, the overshoot reduction circuit 1000 may be connected to the node between the inductor L and the series circuit of the resistor RESR and the capacitor COUT. The overshoot reduction circuit 1000 may receive the output voltage VOUT of the buck converter. The overshoot reduction circuit 1000 may be connected to the output terminal of the operational transconductance amplifier OTA of the buck converter through the fourth comparison input terminal such as the inverting terminal of the second comparator COM2. The overshoot reduction circuit 1000 may receive the error amplified signal EAO from the operational transconductance amplifier OTA.

The overshoot reduction circuit 1000 receives the lower bridge conducted signal LGON indicating an operational state of the lower bridge switch LG of the buck converter. The overshoot reduction circuit 1000 may output the lower bridge switching signal LGONF to the logic circuit LGC of the buck converter, according to the lower bridge conducted signal LGON, the error amplified signal EAO and the output voltage VOUT of the buck converter.

The logic circuit LGC may output a logic signal to the driver circuit DRV to control the driver circuit DRV to drive the upper bridge switch UG and the lower bridge switch LG of the switch circuit, according to the lower bridge conducted signal LGON from the overshoot reduction circuit 1000 and the control signal from the control circuit COL of the buck converter. It is worth noting that, before the buck converter outputs an overshoot voltage or an overshoot current, the driver circuit DRV turns off the lower bridge switch LG of the buck converter. As a result, a current flows to the output terminal of the buck converter through an internal diode of the lower bridge switch LG, thereby preventing the overshoot voltage or the overshoot current from being output by the buck converter.

More specifically, when a load of the buck converter releases energy, the second capacitor voltage signal Toff outputted by the pulse calculator circuit HDV of the overshoot reduction circuit 1000 is higher than the first sample compared signal Toffavg outputted by the second sampler circuit SAM2. For example, the second capacitor voltage signal Toff is larger than or equal to N times of the first sample compared signal Toffavg, which is calculated by the following equation: C2=C1×N, wherein N depends on a ratio of the capacitance of the first capacitor C1 and the capacitance of the second capacitor C2 as shown in FIG. 1. As a result, the first comparator COM1 outputs the first comparing signal at a high level to the switch driver circuit LD.

In addition, when the load of the buck converter releases energy, the output voltage VOUT of the buck converter increases such that the error amplified signal EAO outputted by the operational transconductance amplifier OTA is lower than the reference voltage of the reference voltage source Vth. As a result, the second comparator COM2 outputs the second comparing signal at a high level to the switch driver circuit LD.

The switch driver circuit LD of the overshoot reduction circuit 1000 outputs the lower bridge switching signal LGONF at a high level to the logic circuit LGC, according to the first comparing signal at a high level from the first comparator COM1 and the second comparing signal at a high level from the second comparator COM2. The logic circuit LGC outputs the logic signal at a high level to the driver circuit DRV to control the driver circuit DRV to turn off the lower bridge switch LG, according to the lower bridge switching signal LGONF at the high level.

Figure 3A:
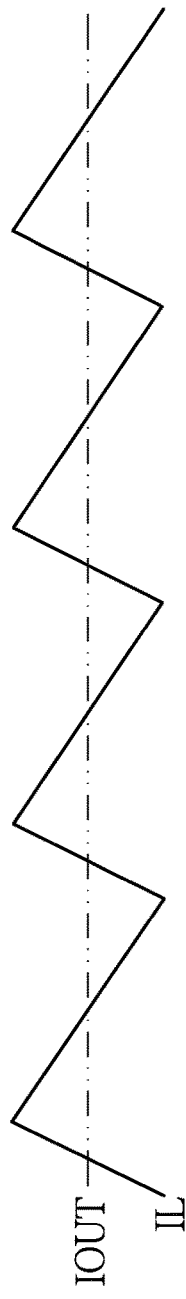
FIG. 3A is a signal waveform diagram of an output current and an inductor current of the buck converter under condition of a constant output current according to an embodiment of the present disclosure.
Figure 3B:
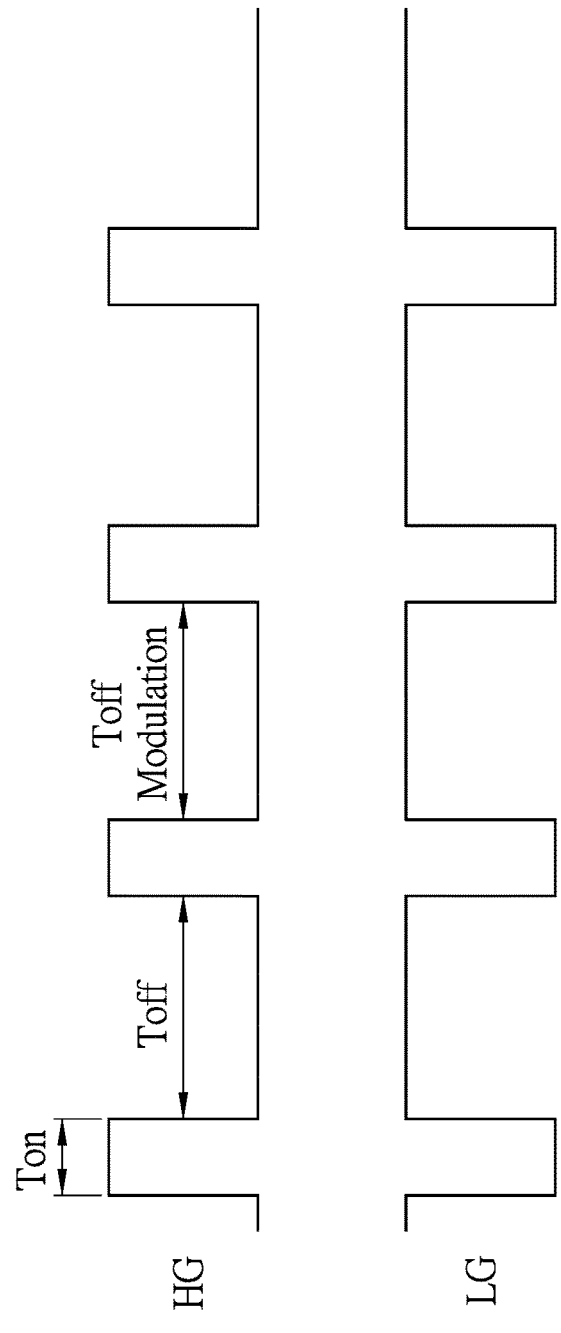
FIG. 3B is a signal waveform diagram of an upper bridge switching signal and a lower bridge switching signal of the buck converter under conditions of a constant output current and a constant conduction time according to the embodiment of the present disclosure.
Figure 3C:
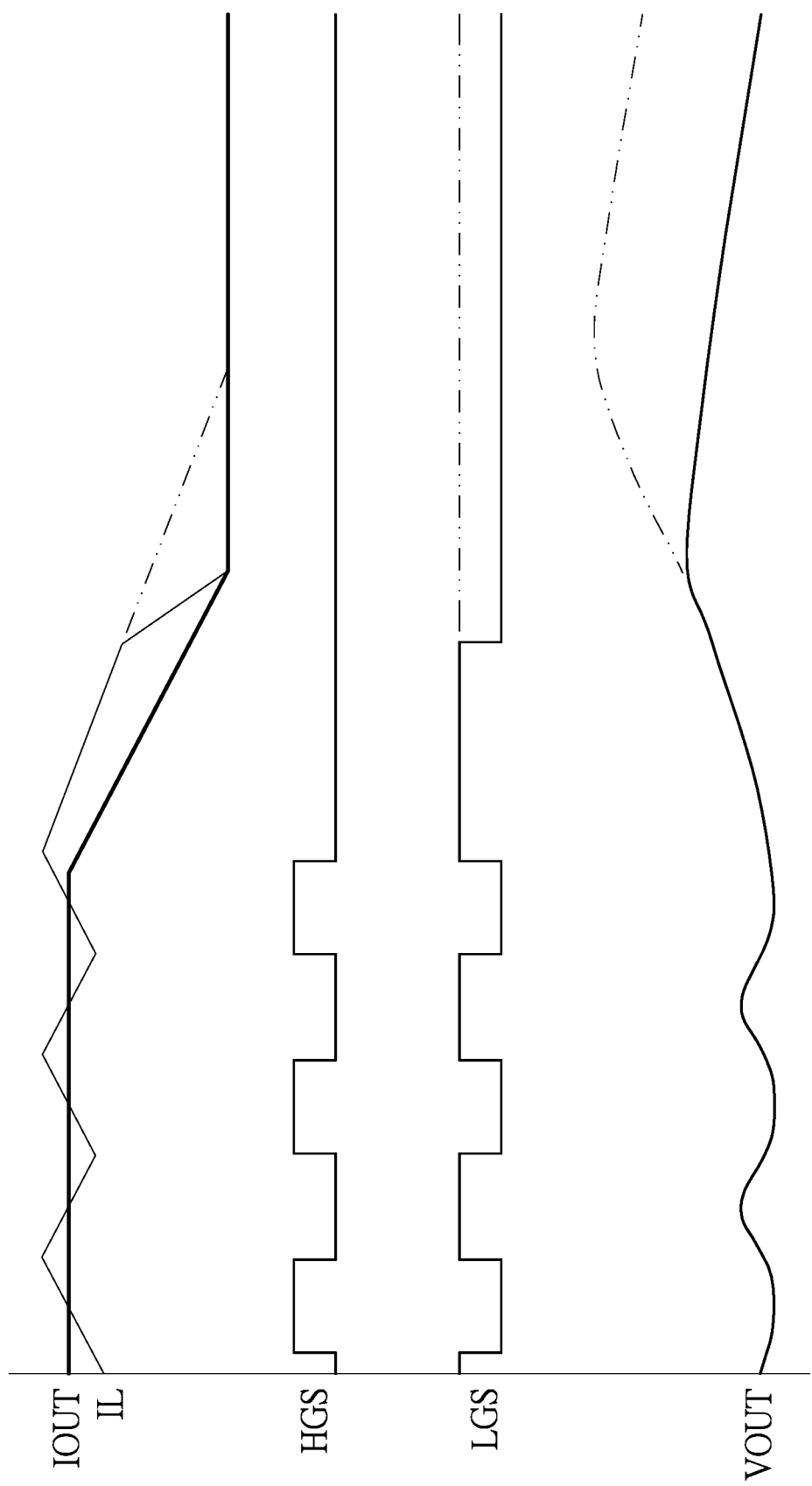
FIG. 3C is a signal waveform diagram of an output current, an inductor current, an upper bridge switching signal, a lower bridge switching signal and an output voltage of the buck converter during a transition from a heavy load to a light load according to the embodiment of the present disclosure.

Reference is made to FIGS. 3A, 3B and 3C, wherein FIG. 3A is a signal waveform diagram of an output current and an inductor current of the buck converter under condition of a constant output current according to an embodiment of the present disclosure, FIG. 3B is a signal waveform diagram of an upper bridge switching signal and a lower bridge switching signal of the buck converter under conditions of a constant output current and a constant conduction time according to the embodiment of the present disclosure, and FIG. 3C is a signal waveform diagram of an output current, an inductor current, an upper bridge switching signal, a lower bridge switching signal and an output voltage of the buck converter during a transition from a heavy load to a light load according to the embodiment of the present disclosure.

As shown in FIGS. 3A to 3C, IOUT represents an output current of the buck converter 2000 shown in FIG. 2A or the buck converter shown in FIG. 2B. IL represents a current flowing through the inductor L1 of the buck converter 2000 shown in FIG. 2A or through the inductor L of the buck converter shown in FIG. 2B. HGS represents the upper bridge switching signal for controlling the upper bridge switch HG of the buck converter 2000 shown in FIG. 2A or controlling the upper bridge switch UG of the buck converter shown in FIG. 2B. LGS represents the lower bridge switching signal for controlling the lower bridge switch LG of the buck converter 2000 shown in FIG. 2A or the buck converter shown in FIG. 2B. VOUT represents the output voltage of the buck converter 2000 shown in FIG. 2A or the buck converter shown in FIG. 2B.

When the lower bridge switch LG of the buck converter 2000 is not turned off timely, the inductor current IL is generated as shown by a dotted line in FIG. 3C. In contrast, when the lower bridge switch LG of the buck converter 2000 is turned off timely, the inductor current IL overshoot as shown by the dotted line can be effectively reduced to generate the inductor current IL as shown by a solid line in FIG. 3C.

When the output voltage VOUT of the buck converter 2000 shown in FIG. 2A or the buck converter shown in FIG. 2B is higher than a voltage at the node between the first resistor R1 and the second resistor R2 of the voltage driver circuit shown in FIG. 1, the overshoot reduction circuit 1000 turns off the lower bridge switch LG of the buck converter 2000.

After the lower bridge switch LG of the buck converter 2000 is turned off, a system at the output terminal of the buck converter 2000 unloads. At this time, as shown in FIG. 2A, the inductor current IL flows through an internal diode D1 of the lower bridge switch LG to the first terminal such as the drain terminal of the lower bridge switch LG, and then flows to the inductor L1. As a result, the output voltage VOUT of the buck converter 2000 does not has an overshoot voltage as shown by the solid line in FIG. 3C. Conversely, when the lower bridge switch LG is not turned off, the output voltage VOUT of the buck converter 2000 has the overshoot voltage as shown by the dotted line in FIG. 3C. Therefore, an effect of reducing the overshoot of the output voltage can be effectively achieved by the above processes.

Figure 4A:
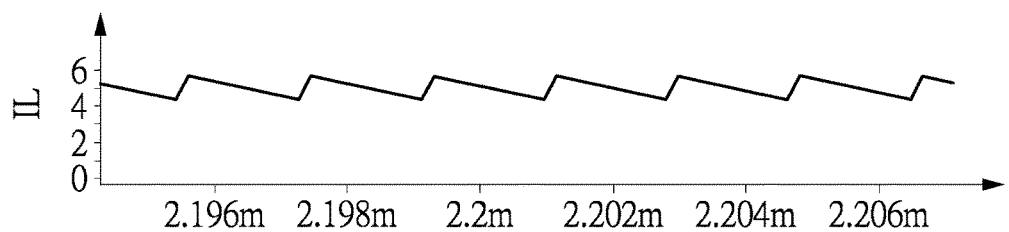
FIG. 4A is a signal waveform diagram of an inductor current of the buck converter according to an embodiment of the present disclosure.
Figure 4B:
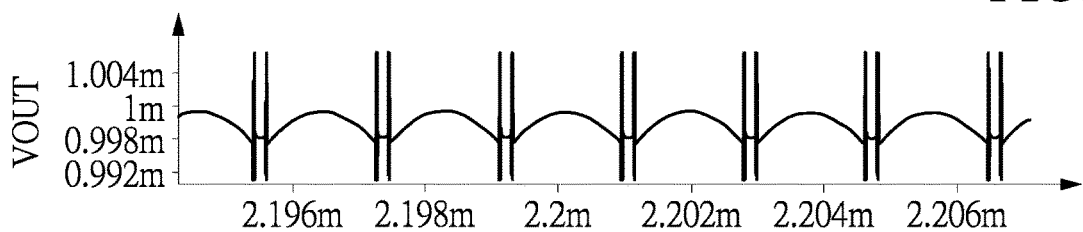
FIG. 4B is a signal waveform diagram of an output voltage of the buck converter according to the embodiment of the present disclosure.
Figure 4C:
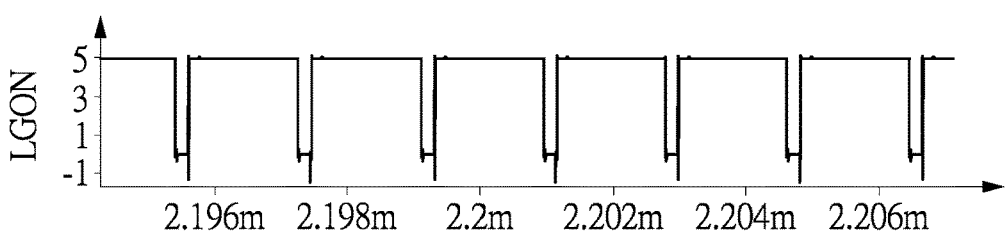
FIG. 4C is a signal waveform diagram of a lower bridge switching signal of the buck converter according to the embodiment of the present disclosure.
Figure 4D:
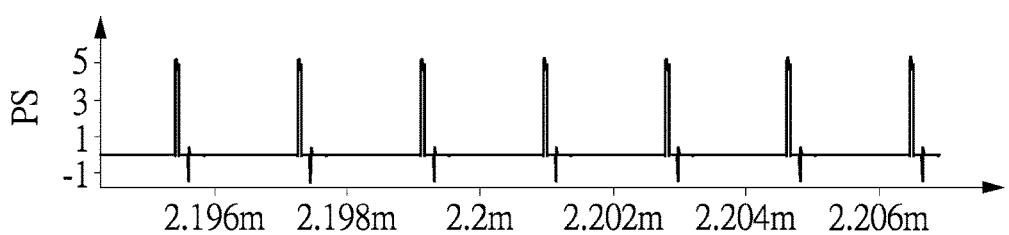
FIG. 4D is a signal waveform diagram of a first pulse signal of a pulse generator circuit of the overshoot reduction circuit for the buck converter according to the embodiment of the present disclosure.
Figure 4E:
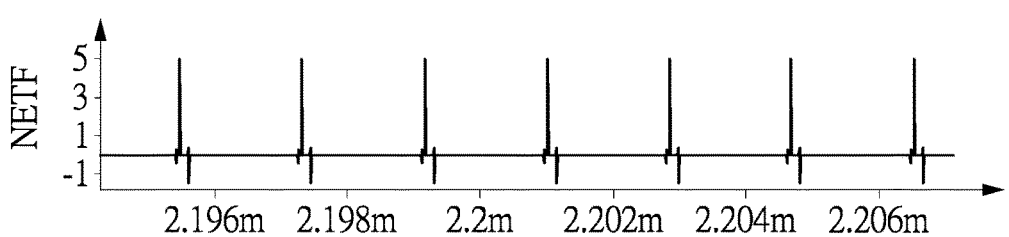
FIG. 4E is a signal waveform diagram of a first capacitor voltage signal of a first sampler circuit of the overshoot reduction circuit for the buck converter according to the embodiment of the present disclosure.
Figure 4F:
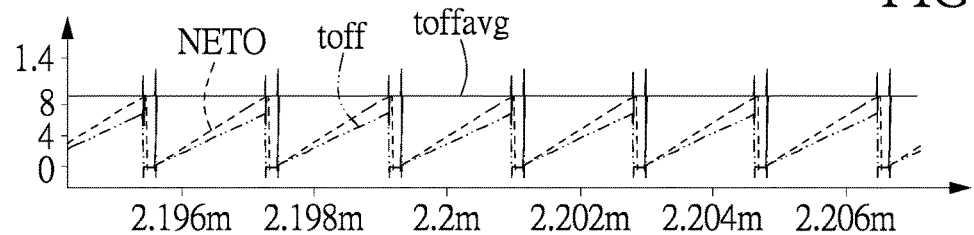
FIG. 4F is a signal waveform diagram of a second capacitor voltage signal of a second sampler circuit, a first sample compared signal of a pulse generator circuit and a second pulse signal of the pulse generator circuit of the overshoot reduction circuit for the buck converter according to the embodiment of the present disclosure.
Figure 5A:
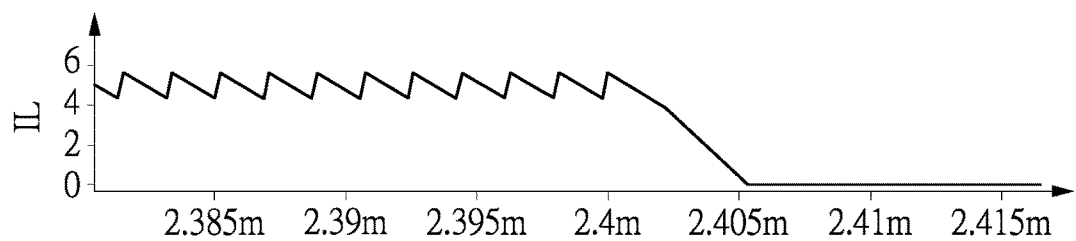
FIG. 5A is a signal waveform diagram of the inductor current of the buck converter according to the embodiment of the present disclosure.
Figure 5B:
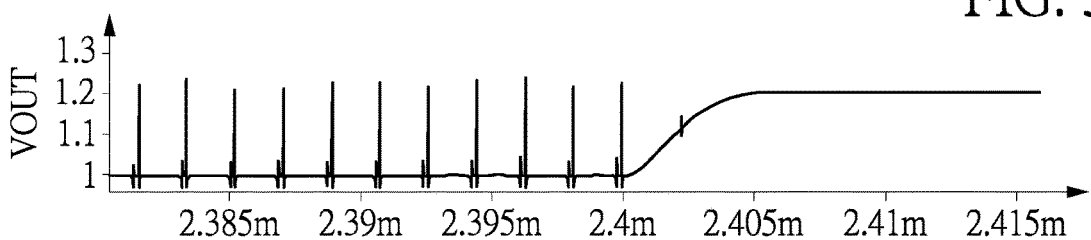
FIG. 5B is a signal waveform diagram of the output voltage of the buck converter according to the embodiment of the present disclosure.
Figure 5C:
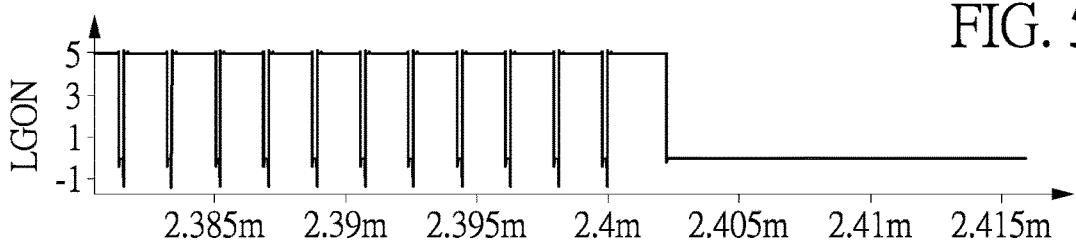
FIG. 5C is a signal waveform diagram of the lower bridge switching signal of the buck converter according to the embodiment of the present disclosure.
Figure 5D:
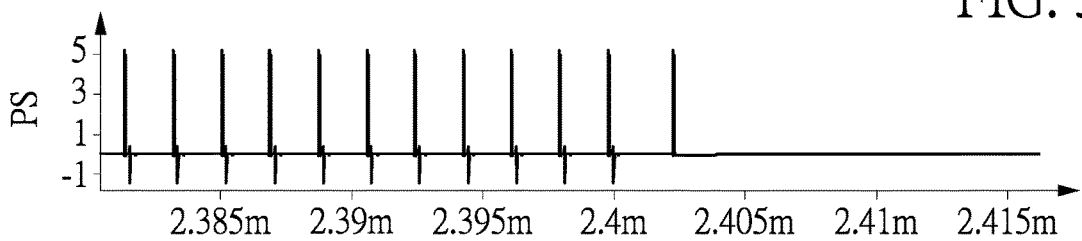
FIG. 5D is a signal waveform diagram of the first pulse signal of the pulse generator circuit of the overshoot reduction circuit for the buck converter according to the embodiment of the present disclosure.
Figure 5E:
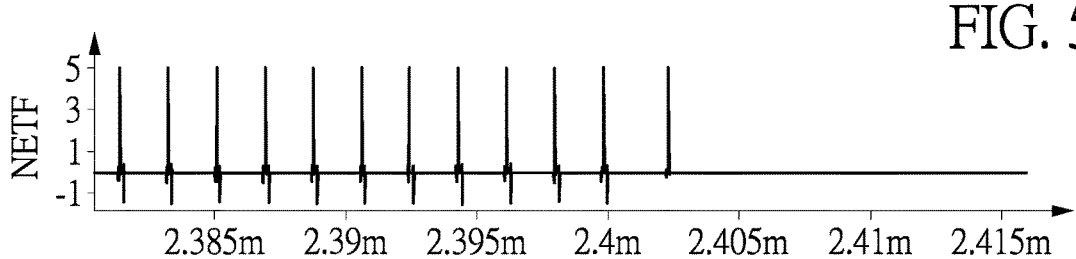
FIG. 5E is a signal waveform diagram of the first capacitor voltage signal of the first sampler circuit of the overshoot reduction circuit for the buck converter according to the embodiment of the present disclosure.
Figure 5F:
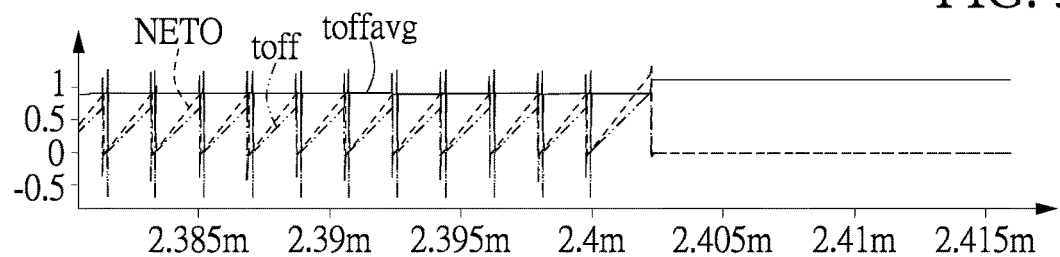
FIG. 5F is a signal waveform diagram of the second capacitor voltage signal of the second sampler circuit, the first sample compared signal of the pulse generator circuit and the second pulse signal of the pulse generator circuit of the overshoot reduction circuit for the buck converter according to the embodiment of the present disclosure.

Reference is made to FIGS. 4A, 4B, 4C, 4D, 4E, 4F, 5A, 5B, 5C, 5D, 5E and 5F, wherein FIGS. 4A and 5A are signal waveform diagrams of an inductor current of the buck converter according to an embodiment of the present disclosure; FIGS. 4B and 5B are signal waveform diagrams of an output voltage of the buck converter according to the embodiment of the present disclosure; FIGS. 4C and 5C are signal waveform diagrams of a lower bridge switching signal of the buck converter according to the embodiment of the present disclosure ; FIGS. 4D and 5D are signal waveform diagrams of a first pulse signal of a pulse generator circuit of the overshoot reduction circuit for the buck converter according to the embodiment of the present disclosure; FIGS. 4E and 5E are signal waveform diagrams of a first capacitor voltage signal of a first sampler circuit of the overshoot reduction circuit for the buck converter according to the embodiment of the present disclosure; and FIGS. 4F and 5F are signal waveform diagrams of a second capacitor voltage signal of a second sampler circuit, a first sample compared signal of a pulse generator circuit and a second pulse signal of the pulse generator circuit of the overshoot reduction circuit for the buck converter according to the embodiment of the present disclosure. FIGS. 4A, 4B, 4C, 4D, 4E and 4F are partial enlarged diagrams of the signal waveforms of FIGS. 5A, 5B, 5C, 5D, 5E and 5F, respectively.

As shown in FIGS. 4A and 5A, IL represents the inductor current of the buck converter 2000 shown in FIG. 2A or the buck converter shown in FIG. 2B. As shown in FIG. 5A, when the buck converter 2000 shown in FIG. 2A or the buck converter shown in FIG. 2B is turned off by the overshoot reduction circuit 1000 shown in FIG. 1, a current of the last wave of the inductor current IL of the inductor L1 of the buck converter 2000 shown in FIG. 2A or the inductor L of the buck converter shown in FIG. 2B decreases to almost zero.

As shown in FIGS. 4A and 5B, VOUT represents the output voltage of the buck converter 2000 shown in FIG. 2A or the buck converter shown in FIG. 2B. As shown in FIG. 5B, when the buck converter 2000 shown in FIG. 2A or the buck converter shown in FIG. 2B is turned off by the overshoot reduction circuit 1000 shown in FIG. 1, the output voltage VOUT of the buck converter 2000 shown in FIG. 2A or the buck converter shown in FIG. 2B gradually increases such that a constant output current is generated. For example, the constant output current has a current value of about 1.2 amps, which is lower than a current threshold. That is, an overshoot current is not generated.

As shown in FIGS. 4A and 5C, LGON represents the lower bridge conducted signal of the lower bridge switch LG of the buck converter 2000 shown in FIG. 2A or the buck converter shown in FIG. 2B. More specifically, when a waveform of the lower bridge conducted signal LGON reaches a high level, the lower bridge switch LG of the buck converter 2000 shown in FIG. 2A or the buck converter shown in FIG. 2B is turned on. Conversely, when the waveform of the lower bridge conducted signal LGON falls to a low level from a high level, the lower bridge switch LG of the buck converter 2000 shown in FIG. 2A or the buck converter shown in FIG. 2B is turned off.

When the lower bridge conducted signal LGON shown in FIGS. 4C and 5C indicates that the lower bridge switch LG of the buck converter 2000 is turned off, the pulse generator circuit PUG of the overshoot reduction circuit 1000 shown in FIG. 1 generates a pulse signal PS shown in FIGS. 4D and 5D. At this time, as shown in FIGS. 4E and 5E, the first sampler circuit SAM1 of the overshoot reduction circuit 1000 samples a first capacitor voltage signal NETF of the first capacitor C1.

The pulse calculator circuit HDV of the overshoot reduction circuit 1000 shown in FIG. 1 stores the pulse signal PS of the pulse generator circuit PUG and the first capacitor voltage signal NETF of the overshoot reduction circuit 1000. The pulse calculator circuit HDV then calculates an average value such as a time average of the pulse signal PS and the first capacitor voltage signal NETF, and accordingly outputs the first sample compared signal Toffavg as shown in FIGS. 4F and 5F.

As shown in FIGS. 4F and 5F, Toff represents the second capacitor voltage signal Toff of the second capacitor C2 that is sampled by the second sampler circuit SAM2 of the overshoot reduction circuit 1000. The first comparator COM1 of the overshoot reduction circuit 1000 shown in FIG. 1 compares the first sample compared signal Toffavg with the second capacitor voltage signal Toff to output the lower bridge switching signal LGONF to the lower bridge switch LG of the buck converter 2000 to control the lower bridge switch LG It is worth noting that, the lower bridge switch LG is turned off timely, thereby preventing an overshoot voltage and an overshoot current from being generated by the buck converter 2000.

In summary, the present disclosure provides the overshoot reduction circuit for the buck converter, which can turn on or off the lower bridge switch of the buck converter, according to a conduction state of the lower bridge switch. It is worth noting that the lower bridge switch of the buck converter is turned off before the output voltage of the buck converter reaches a voltage threshold and the output current reaches a current threshold. As a result, the current flows from the source terminal of the lower bridge switch through the internal diode of the lower bridge switch to the inductor and the capacitor at the output terminal of the buck converter. Therefore, it can effectively prevent the overshoot voltage and the overshoot current from being generated by the buck converter.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An overshoot reduction circuit for a buck converter, the buck converter including an upper bridge switch, a lower bridge switch and an operational transconductance amplifier, wherein a first terminal of the upper bridge switch is connected to an input voltage source, a second terminal of the upper bridge switch is connected to a first terminal of the lower bridge switch, a second terminal of the lower bridge switch is grounded, a first input terminal of the operational transconductance amplifier is connected to a first reference voltage source, a second input terminal of the operational transconductance amplifier is connected to a node between the second terminal of the upper bridge switch and the first terminal of the lower bridge switch, and the overshoot reduction circuit comprising:

an operational amplifier having a first amplification input terminal and a second amplification input terminal, wherein the first amplification input terminal of the operational amplifier is connected to a node between the first terminal of the upper bridge switch and the second terminal of the lower bridge switch to obtain a buck converted signal, an output terminal of the operational amplifier is grounded through a voltage divider circuit, the voltage divider circuit includes a first resistor and a second resistor, the second amplification input terminal of the operational amplifier is connected to a node between the first resistor and the second resistor to obtain a voltage feedback signal, and the operational amplifier is configured to output an operation amplified signal according to the buck converted signal and the voltage feedback signal;

a first sampler circuit grounded through a first capacitor and configured to sample a first capacitor voltage signal of the first capacitor according to a lower bridge conducted signal of the lower bridge switch from the buck converter;

a pulse generator circuit configured to output a pulse signal according to the lower bridge conducted signal from the buck converter;

a pulse calculator circuit connected to the first sampler circuit and the pulse generator circuit, and configured to store and output a first sample compared signal according to the first capacitor voltage signal and the pulse signal;

a second sampler circuit grounded through a second capacitor and configured to sample a second capacitor voltage signal of the second capacitor according to the lower bridge conducted signal of the lower bridge switch from the buck converter;

a first comparator having a first comparison input terminal connected to the second sampler circuit and a second comparison input terminal connected to the pulse generator circuit, and configured to compare the second capacitor voltage signal received through the first comparison input terminal with the first sample compared signal received through the second comparison input terminal to output a first comparing signal;

a second comparator having a third comparison input terminal connected to a second reference voltage source and a fourth comparison input terminal connected to an output terminal of the operational transconductance amplifier, wherein the second comparator receives a reference voltage from the second reference voltage source through the third comparison input terminal and receives an error amplified signal from the operational transconductance amplifier through the fourth comparison input terminal, the second comparator is configured to compare the error amplified signal with the reference voltage to output a second comparing signal; and a switch driver circuit connected to the first comparator, the second comparator, and a control terminal of the lower bridge switch, and configured to output a lower bridge switching signal to the lower bridge to control the lower bridge according to the first comparing signal and the second comparing signal.

2. The overshoot reduction circuit of claim 1, wherein the pulse generator circuit is configured to calculate an average voltage of a voltage of the first capacitor voltage signal and a voltage of the pulse signal, and accordingly output the first sample compared signal to the first comparator.

3. The overshoot reduction circuit of claim 1, wherein the first comparison input terminal of the first comparator is a non-inverting input terminal and the second comparison input terminal is an inverting input terminal, the third comparison input terminal of the third comparator is a non-inverting input terminal and the fourth comparison input terminal is an inverting input terminal;

when a voltage of the first sample compared signal is higher than a voltage of the second capacitor voltage signal, the first comparator outputs the first comparing signal at a high level to the switch driver circuit;

when a voltage of the error amplified signal is higher than a voltage of the second reference voltage source, the second comparator outputs the second comparing signal at a high level to the switch driver circuit; and the switch driver circuit turns off the lower bridge according to the first comparing signal at the high level and the second comparing signal at the high level.

4. The overshoot reduction circuit of claim 1, further comprising:

a first switch having a control terminal connected to the output terminal of the operational amplifier, a first terminal connected to a common voltage source, and a second terminal connected to the first resistor.

5. The overshoot reduction circuit of claim 1, further comprising:

a second switch having a control terminal connected to the output terminal of the operational amplifier, a first terminal connected to a common voltage source, and a second terminal connected to the first capacitor through the first sampler circuit.

6. The overshoot reduction circuit of claim 1, further comprising:

a third switch having a control terminal connected to an output terminal of the pulse generator circuit, a first terminal connected to a node between the first sampler circuit and the first capacitor, and a second terminal grounded.

7. The overshoot reduction circuit of claim 1, further comprising:

a fourth switch having a control terminal connected to the output terminal of the operational amplifier, a first terminal connected to a common voltage source, and a second terminal connected to the second capacitor through the second sampler circuit.

8. The overshoot reduction circuit of claim 1, further comprising:

a fifth switch having a control terminal connected to an output terminal of the pulse generator circuit, a first terminal connected to a node between the second sampler circuit and the second capacitor, and a second terminal grounded.

\* \* \* \* \*